United States Patent
Herscovici

[15] 3,680,587
[45] Aug. 1, 1972

[54] CONTROL VALVE MEMBER HAVING VIBRATION DAMPING

[72] Inventor: Saul Herscovici, Waterloo, Iowa
[73] Assignee: Deere & Company, Moline, Ill.
[22] Filed: Oct. 21, 1970
[21] Appl. No.: 82,747

[52] U.S. Cl............................137/514.3, 137/514.5
[51] Int. Cl..............................................F16k 15/02
[58] Field of Search............137/514.3, 514.5, 514.7; 251/50, 51

[56] References Cited

UNITED STATES PATENTS 2,667,893  2/1954  Kupiec...................137/514.7 X
2,927,604  3/1960  Johnson......................137/514.5

FOREIGN PATENTS OR APPLICATIONS 227,046  9/1962  Austria.......................137/514.3

*Primary Examiner*—Robert G. Nilson
*Attorney*—H. Vincent Harsha, Harold M. Knoth, William A. Murray, John M. Nolan and Jimmie R. Oaks

[57] ABSTRACT

A valve member is spring-biased to close an orifice between an inlet port and an outlet port and is shifted to meter fluid through the orifice by inlet pressure great enough to overcome the spring force. The valve member includes two sections telescoped together to define an expansible and retractable fluid chamber. Inlet fluid is permitted into the chamber via a passage in one of the sections and a check valve prevents reverse flow through the passage. There is a diametral clearance between the two sections through which fluid is forced resulting in high-fluid damping when the two sections telescope together, such as would be caused by a pulsating source of inlet fluid. In a second embodiment, a second passage connects the chamber with the sump, and a check valve in the second passage normally prevents flow to the sump, while allowing the release of fluid when the pressure in the chamber is much higher than normal inlet fluid pressures.

22 Claims, 2 Drawing Figures

*INVENTOR.*
SAUL HERSCOVICI 3,680,587

CONTROL VALVE MEMBER HAVING VIBRATION DAMPING

BACKGROUND OF THE INVENTION

The present invention relates to vibration damping means for a fluid control valve member.

Fluid control valves often include valve members which vibrate during operation when excited by a pulsating fluid source, such as that delivered by gear or piston pumps. If the pressures accompanying these vibrations are sufficiently high, fatigue failure of hoses and/or gaskets may occur, resulting in leakage. Noise may also result from the vibrations.

In most cases, when the valve member starts vibrating, it does not stop, because its capacity of dissipating energy through friction is much smaller than the quantity of energy generated by the vibrations. This is so because valve tolerances have to be such as to permit quick valve member reaction or responsiveness.

SUMMARY OF THE INVENTION

According to the present invention there is provided a novel damping means for a control valve member, and more specifically there is provided fluid damping means for eliminating valve member oscillation and noise generation.

It is an object of the invention to provide a valve member having an expansible and retractable chamber from which fluid is forced through a restricted path to dissipate energy generated due to fluid pulsations.

It is a further object to provide fluid damping, while at the same time retaining quick valve motion to the metering position after start-up or after a high-pressure drop between the fluid inlet and the fluid outlet.

Another object is to provide fluid damping, while at the same time retaining quick valve motion to stop flow between the fluid inlet and the fluid outlet when there is a large pressure drop in the fluid system and/or when the fluid is cold.

These and other objects will be apparent from the ensuing description and the appended drawings.

DESCRIPTION OF THE PREFERRED EMBODIMENT

Figure 1:
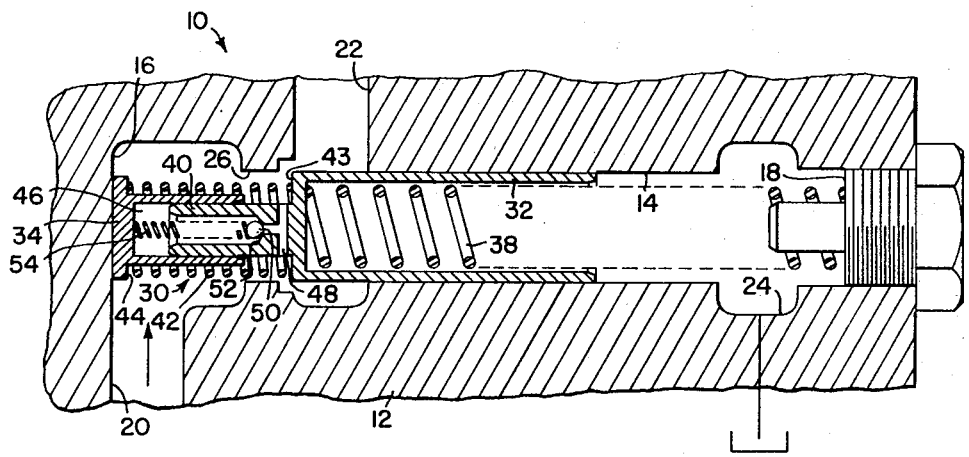
FIG. 1 is a sectional view of a control valve embodying the invention.

Referring now to FIG. 1, there is shown a control valve designated in its entirety by the reference numeral 10 and including a body 12 in which there is a bore 14 having opposite closed ends 16 and 18. Intersecting the bore 14 at axially-spaced locations are an inlet port 20, an outlet port 22 and an exhaust or sump-connected port 24. Between the inlet and outlet ports 20 and 22 is an orifice 26.

Located in the bore 14 is a valve member 30 including first and second sections 32 and 34, the first section 32 being slidably mounted in the bore between the outlet and exhaust ports 22 and 24 and being biased towards a position, wherein it blocks the orifice 26, by means of a spring 38 acting between the first section 32 and the bore end 18. The section 32 is shown shifted rightwardly, as would be the case when the fluid pressure at the inlet port 20 exerts a force on the section 32 which is greater than that exerted by the spring 38, and a reduced diameter stem portion 40 at the end of the section 32 permits flow through the orifice 26. The second section 34 is in the form of a tubular cap and is telescopically received over the stem portion 40. The second section 34 is biased against the bore end 16 by means of a spring 42, which acts between the shoulder 43 of the first section 32 and a shoulder 44 at the end of the second section 34.

The second section 34 and the stem portion 40 of the first section 32 cooperate to define an expansible and retractable chamber 46. Fluid from the inlet port 20 is admitted into the chamber 46 via a fluid passage 48 extending through the stem portion 40. A check ball 50 is biased against a seat 52 in the passage 48 by means of a spring 54 to prevent fluid from escaping from the chamber 46 through the passage 48. When the first and second valve member sections 32 and 34 telescope together, fluid is forced out through a diametral clearance between the second section 34 and the stem portion 40 of the first section 32, thus resulting in high-fluid damping.

Figure 2:
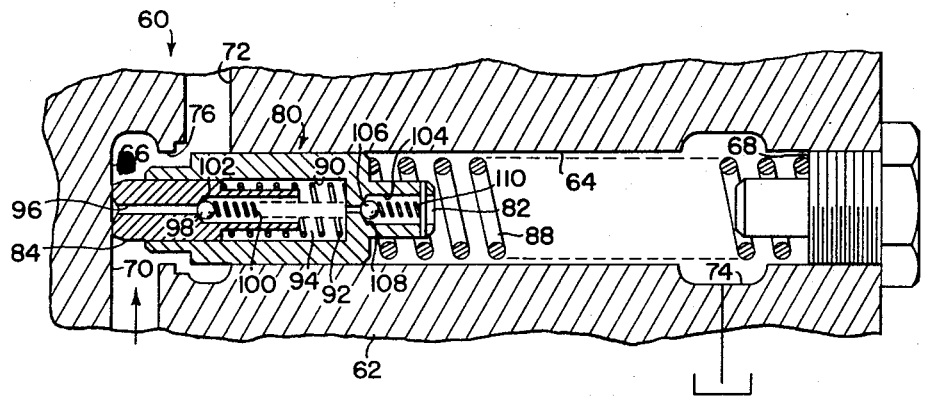
FIG. 2 is a view similar to FIG. 1 but showing a modified form of the invention.

Referring now to FIG. 2, there is shown an embodiment which is functionally quite similar to that illustrated in FIG. 1. Specifically, there is shown a control valve designated in its entirety by the numeral 60 and including a valve body 62 in which there is a valve bore 64 having opposite closed ends 66 and 68. Intersecting the bore 64 at axially-spaced locations are inlet, outlet and exhaust ports 70, 72 and 74 respectively. An orifice 76 is located between the inlet and outlet ports 70 and 72.

Positioned in the bore 64 is a valve member 80 including first and second sections 82 and 84, the first section 82 being axially slidably mounted in the bore between the outlet and exhaust ports 72 and 74 and being biased towards a position wherein it blocks the orifice 76, by means of a spring 88 acting between the first section 82 and the bore end 68. The section 82 is shown shifted as would be the case when the force exerted by fluid pressure on the left end of the section 82 is greater than the force exerted on the section 82 by the spring 88. The second section 84 is piston-or-plunger-like and is telescopically received in a bore 90 in the first section 82 and is biased against the bore end 66 by means of a spring 92 acting between the first and second sections 82 and 84. The sections 82 and 84 cooperate to form an expansible and retractable fluid chamber 94, which is connected to inlet fluid via a fluid passage 96 which extends centrally through the second section 84. A check ball 98 is biased by a spring 100 against a seat 102 in the passage 96 to prevent fluid from escaping from the chamber 94 through the passage 96. There is a diametral clearance between the first and second sections 82 and 84 through which fluid in the chamber 94 is forced when the sections telescope together. An additional feature not included in the embodiment in FIG. 1 is a second passage 104 which extends axially through the first section 82, and joins the chamber 94 with that portion of the bore 64 in fluid communication with the exhaust port 74. A check ball 106 is biased against a seat 108 in the passage 104 by a spring 110 to normally prevent fluid from escaping from the chamber 94. The force of the spring 110 is selected so that the check ball 106 will unseat and permit flow from the chamber 94 only when the pressure in the chamber 94 is much higher than the regulated system pressure, such as would occur when there is a large pressure drop in the system, or when the oil is cold and cannot easily be forced through the diametral clearance between the valve member sections 82 and 84. In either case, the responsiveness of the section 82 to move to block the orifice 76 is enhanced by the second passage 104 and at the same time sufficient fluid damping is preserved through appropriate selection of the spring 110.

The operation of the invention is as follows: First, referring to the embodiment illustrated in FIG. 1, assuming that an average fluid pressure large enough to overcome the force exerted by the spring 38 on the valve member section 32 exists at the inlet port 22, the section 32 will be in a position wherein the orifice 26 is unblocked, and the chamber 46 will be filled with fluid. If pressure pulses above and below the average fluid pressure then occur at the inlet port 22, the valve member sections 32 and 34 will respectively move apart to expand the chamber 46 and telescope together to contract the chamber 46. As the chamber 46 is expanded, the check ball 50 will become unseated to admit additional fluid into the chamber 46. Subsequent contraction of the chamber 46 will tightly seat the check ball 40 and force some of the fluid in the chamber 46 through the diametral clearance between the telescoped portions of the valve member sections 32 and 34. In this way, pulses in fluid pressure at the inlet 22 are damped.

Referring now to the embodiment illustrated in FIG. 2, and assuming that an average fluid pressure large enough to overcome the force exerted by the spring 88 on the valve member section 82 exists at the inlet port 70, the section 82 will be in a position wherein the orifice 26 is unblocked and the chamber 94 will be filled with fluid. Pressure pulses, at the inlet port 70, above and below the average pressure will cause the valve member section 82 to move relative to the section 84 to expand and retract the chamber 94. When the chamber 94 expands, the check ball 98 unseats and additional fluid enters the chamber via the passage 96. Normally the pressure in the chamber 94 is insufficient to unseat the check ball 98, and, when the chamber retracts, fluid is forced through the diametral clearance between the telescoped portions of the valve member sections 82 and 84 to damp the pressure pulsations in a manner similar to the damping of the valve 10 described above. However, if the pressure at the inlet port 70 all at once drops greatly, or if the oil is cold, the action of the spring 88 on the valve member section 82 may cause the pressure in the chamber 94 to increase enough to cause the check ball 106 to unseat and permit fluid in the chamber 94 to escape to the sump through the exhaust port 74. Thus, the valve's responsiveness is retained even under adverse conditions.

I claim

1. A vibration-damped fluid control valve comprising: a valve body defining a bore having inlet and outlet ports; a valve member mounted in said body in operative association with said bore to control the passage of fluid between said inlet and outlet ports; said valve member including an axially shiftably mounted first section axially exposed to and shiftable by fluid pressure at said inlet port; first biasing means acting on said section in opposition to said inlet fluid pressure for maintaining said section at a predetermined position when a predetermined normal operating pressure exists at said inlet port; and damping means for limiting axial movements of said first section away from said predetermined position, caused by pressure pulses, at said inlet port, above and below said normal value, said damping means including a second valve member section telescopically interconnected with said first section and including an end remote from the first section; said valve body defining a stop for engagement by said end of the second section; second biasing means acting between said first and second sections and acting as the sole means holding said second section against said stop means; the telescoped portions of said sections defining an expansible and retractable fluid chamber and there being a small clearance between said portions for permitting the exhaust of fluid from the chamber as the sections telescope together; the forcing of fluid through said clearance thus resulting in fluid damping; passage means in one of said sections for connecting said chamber with fluid at said inlet port for permitting the quick flow of fluid into said chamber at the sections move apart; and check valve means including third biasing means and being located in said passage means for as the fluid in said chamber from exiting through said passage means.

2. The invention defined in claim 1 and further including second passage means in one of said first and second valve member sections for connecting said chamber to a sump and second check valve means in said second passage means for permitting the flow of fluid from said chamber to the reservoir only when the pressure in said chamber is much greater than said normal value.

3. The invention defined in claim 1 wherein said valve member is located in said bore.

4. The invention defined in claim 2 wherein said valve member is located in said bore.

5. The invention defined in claim 1 wherein said second valve member section is in the form of a hollow cap and telescopically receives one end of said first valve member section.

6. The invention defined in claim 1 wherein said second valve member section is in the form of a pin and is telescopically received in a bore in one end of said first valve member section.

7. The invention defined in claim 5 wherein said first-mentioned passage means is located in said first valve member section.

8. The invention defined in claim 6 wherein said first-mentioned passage means is located axially in said second valve member section.

9. The invention defined in claim 2 wherein said second passage means is located axially in said first valve member section.

10. The invention defined in claim 8 wherein said second passage means is located axially in said first valve member section.

11. In a fluid control valve of the type including a valve body defining a bore having inlet and outlet ports; a valve member means mounted in said bore for controlling the flow of fluid between said inlet and outlet ports; and said member means including a first member section mounted for axial shifting in response to changes in fluid pressure at least at one of said inlet and outlet ports, the improvement comprising: a second member section telescopically interconnected with said first section and having an end remote from the first section, said valve body including a stop surface located for engagement by said second section end; biasing means acting between said first and second member sections and acting as the sole means holding said second member end against said stop surface; the telescoped portions of said first and second member sections cooperating to form an expansible and retractable fluid chamber and being dimensioned such that a small clearance exists therebetween for permitting the exhaust of fluid from the chamber when said sections telescope together; a fluid passage in one of said first and second member sections connecting said chamber with fluid pressure at said inlet port and a check valve means including a second biasing means and being located in said passage for preventing the exhaust of fluid from said chamber via said passage.

12. A vibration-damped fluid control valve comprising: a valve body defining a bore having axially-spaced inlet and outlet ports; a first valve member section having axially-facing portions exposed to fluid pressure at said inlet port and being axially shiftably mounted in said bore for movement therein in response to pressure changes at said inlet port for controlling flow between said inlet and outlet ports; first biasing means acting on said section in opposition to said inlet port fluid pressure for maintaining said section at a predetermined position when a predetermined normal operating pressure exists at said inlet port; means for damping the movements of said section caused by pressure pulses above and below said normal operating pressure including a second valve member section being telescopically interconnected with and having an end facing axially away from said first section; said valve body including a stop located for engagement by said second section end; second biasing means acting between said first and second sections and acting as the sole means for holding said second section against said stop; the telescoped portions forming an expansible and retractable fluid chamber and having a small clearance therebetween for permitting fluid to exit from said chamber when the sections move together; a first fluid passage in one of said first and second valve member sections connecting fluid pressure at said inlet port to said chamber; and check valve means including third biasing means located in said first passage for preventing fluid in said chamber from exiting through said first passage.

13. The invention defined in claim 12 wherein said bore further has a sump port and said first valve member section is located between said outlet and sump ports; a second fluid passage connecting said chamber with said outlet port; and check valve means in said second passage for permitting flow to said sump only when the pressure in said chamber is a predetermined amount greater than said normal operating pressure.

14. The invention defined in claim 12 wherein said second valve member section is cap-like and said first valve member section includes a stem portion telescopically received in said second section.

15. The invention defined in claim 12 wherein said first and second valve member sections include opposed shoulders and said second biasing means being a compression spring acting between said opposed shoulders.

16. The invention defined in claim 14 wherein said first and second valve member sections include opposed shoulders and said second biasing means being a compression spring acting between said opposed shoulders.

17. The invention defined in claim 14 wherein said first fluid passage is in said stem portion.

18. The invention defined in claim 15 wherein said second valve member section is cap-like, said first valve member section including a stem portion telescopically received in said second section and said first fluid passage being in said stem portion.

19. The invention defined in claim 12 wherein said second valve member section is pin-like and is telescopically received in said first valve member section.

20. The invention defined in claim 19 wherein said first fluid passage extends axially through said second section.

21. The invention defined in claim 19 wherein said bore further has a sump port and said first valve member section is located between said outlet and sump ports; a second fluid passage connecting said chamber with said outlet port; and check valve means in said second passage for permitting flow to said sump only when the pressure in said chamber is a predetermined amount greater than said normal operating pressure.

22. The invention defined in claim 21 wherein said second fluid passage extends axially through said first section.

* * * * *

UNITED STATES PATENT OFFICE
CERTIFICATE OF CORRECTION

Patent No. 3,680,587          Dated  1 August 1972

Inventor(s) Saul Herscovici

It is certified that error appears in the above-identified patent and that said Letters Patent are hereby corrected as shown below:

Column 4, line 26, after "chamber", change "at" to -- as --; line 29, change "as the" to -- preventing --.

Signed and sealed this 6th day of March 1973.

(SEAL)
Attest:

EDWARD M. FLETCHER, JR.          ROBERT GOTTSCHALK
Attesting Officer                Commissioner of Patents